(12) United States Patent
Majidi et al.

(10) Patent No.: US 12,486,443 B2
(45) Date of Patent: Dec. 2, 2025

(54) MULTIFUNCTIONAL SHAPE MORPHING ELASTOMER WITH LIQUID METAL INCLUSIONS

(71) Applicant: CARNEGIE MELLON UNIVERSITY, Pittsburgh, PA (US)

(72) Inventors: Carmel Majidi, Pittsburgh, PA (US); Michael Ford, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 17/486,713

(22) Filed: Sep. 27, 2021

(65) Prior Publication Data

US 2022/0098461 A1   Mar. 31, 2022

Related U.S. Application Data

(60) Provisional application No. 63/083,138, filed on Sep. 25, 2020.

(51) Int. Cl.
*C09K 5/10* (2006.01)
*H01B 1/22* (2006.01)

(52) U.S. Cl.
CPC ............. *C09K 5/10* (2013.01); *H01B 1/22* (2013.01); *C08K 2201/001* (2013.01)

(58) Field of Classification Search
CPC ... C09K 5/10; H01B 1/20; H01B 1/22; H01B 3/002; H01B 3/004; H01B 3/18; H01B 3/20; H01B 3/301; H01B 3/302; C08K 3/08; C08K 9/02; C08K 2201/001; C08K 2201/0011; C08J 3/28; C08J 2300/12; C08J 2300/26

See application file for complete search history.

(56) References Cited

U.S. PATENT DOCUMENTS

| | | | |
|---|---|---|---|
| 9,969,847 B2 * | 5/2018 | Resetic | C09K 19/38 |
| 2017/0218167 A1 * | 8/2017 | Majidi | H01B 1/22 |
| 2021/0205103 A1 * | 7/2021 | Xiao | C09K 19/38 |

FOREIGN PATENT DOCUMENTS

| | | | | |
|---|---|---|---|---|
| WO | WO-2019136252 A1 * | 7/2019 | | C08G 77/04 |
| WO | WO-2021110734 A1 * | 6/2021 | | C08G 77/52 |

OTHER PUBLICATIONS

Yakacki et al. ("Tailorable and programmable liquid-crystalline elastomers using a two-stage thiol-acrylate reaction," RSC Adv., 2015, 5, 18997-19001) (Year: 2015).*

(Continued)

*Primary Examiner* — Matthew R Diaz
(74) *Attorney, Agent, or Firm* — Michael G. Monyok (57) ABSTRACT

A polymer composite having shape-morphing capabilities where the composite comprises a liquid crystal elastomer and liquid metal inclusions to improve thermal and/or electrical conductivity. The liquid metal inclusions are metals such as Gallium, alloys of Gallium, eutectic alloys, and other metals that have low melting points. The composite is soft and stretchable, while still retaining the shape-morphing characteristics of the liquid crystal elastomer. The composite is an electrical insulator, yet conductivity can be induced through mechanical pressure.

16 Claims, 11 Drawing Sheets

(56) References Cited

OTHER PUBLICATIONS

Fassler et al. ("Liquid-phase metal inclusions for a conductive polymer composite," Adv. Mater., vol. 27, No. 11, pp. 1928-1932, 2015) (Year: 2015).*
Jeong et al. ("Mechanically stretchable and electrically insulating thermal elastomer composition by liquid alloy droplet embedment," Sci. Rep. 5, 18257, 2015) (Year: 2015).*
Dickey ("Stretchable and soft electronics using liquid metals," Adv. Mater., 2017, 29, 1606425) (Year: 2017).*
Barlett et al. ("High thermal conductivity in soft elastomers with elongated liquid metal inclusions," PNAS, vol. 114, No. 9, pp. 2143-2148, 2017) (Year: 2017).*
Markvicka et al. ("An autonomously electrically self-healing liquid metal-elastomer composite for robust soft-matter robotics and electronics," Nature Materials, vol. 17, No. 7, pp. 618-624, 2018) (Year: 2018).*
Sun ("Bio-inspired robotics based on liquid crystalline elastomers (LCEs) and flexible stimulators," Doctoral Dissertation, University of Colorado Boulder, 2018) (Year: 2018).*
Kim et al. ("Intelligently actuating liquid crystal elastomer-carbon nanotube composites," Adv. Funct. Mater. 29, 1905063, 2019) (Year: 2019).*
Ford et al. ("A multifunctional shape-morphing elastomer with liquid metal inclusions," PNAS, vol. 116, No. 43, pp. 21438-21444, 2019) (Year: 2019).*
U.S. Appl. No. 62/935,509 (Year: 2019).*
Kim ("Liquid crystal elastomers for actuators and electronics", Doctoral Dissertation, University of Texas at Dallas, 2019) (Year: 2019).*
Wermter, H. et al. "Liquid crystalline elastomers as artificial muscles." e-Polymers 1, No. 1 (2001).
Chambers, M. et al. "Liquid crystal elastomer-nanoparticle systems for actuation." Journal of Materials Chemistry 19, No. 11 (2009): 1524-1531.
Courty, S. et al. "Nematic elastomers with aligned carbon nanotubes: New electromechanical actuators." EPL (Europhysics Letters) 64, No. 5 (2003): 654.
Marshall, J. et al. "Carbon-nanotube sensitized nematic elastomer composites for IR-visible photo-actuation." Soft Matter 8, No. 5 (2012): 1570-1574.
Yang, L. et al. "Reversible infrared actuation of carbon nanotube-liquid crystalline elastomer nanocomposites." Advanced Materials 20, No. 12 (2008): 2271-2275.
Wang, C. et al. "Soft ultrathin electronics innervated adaptive fully soft robots." Advanced Materials 30, No. 13 (2018): 1706695.
Boley, JW et al. "Mechanically sintered gallium-indium nanoparticles." Advanced Materials 27, No. 14 (2015): 2355-2360.
Yakacki, C. M. et al. "Tailorable and programmable liquid-crystalline elastomers using a two-stage thiol-acrylate reaction." RSC Advances 5, No. 25 (2015): 18997-19001.
Bartlett, M. et al. "High thermal conductivity in soft elastomers with elongated liquid metal inclusions." Proceedings of the National Academy of Sciences 114, No. 9 (2017): 2143-2148.
Markvicka, E. et al. "An autonomously electrically self-healing liquid metal-elastomer composite for robust soft-matter robotics and electronics." Nature materials 17, No. 7 (2018): 618-624.
Fassler, A. et al. "Liquid-phase metal inclusions for a conductive polymer composite." Advanced Materials 27, No. 11 (2015): 1928-1932.

* cited by examiner

MULTIFUNCTIONAL SHAPE MORPHING ELASTOMER WITH LIQUID METAL INCLUSIONS

CROSS-REFERENCE TO RELATED APPLICATIONS

This application claims the benefit under 35 U.S.C. § 119 of U.S. Provisional Application Ser. No. 63/083,138, filed Sep. 25, 2020, which is incorporated herein by reference.

STATEMENT REGARDING FEDERALLY SPONSORED RESEARCH

This invention was made with U.S. government support under contract or award No. W911NF1810150 awarded by the U.S. Army Research Office and the U.S. Army Research Laboratory. The U.S. government has certain rights in the invention.

BACKGROUND OF THE INVENTION

The present disclosure is related generally to elastomers. More specifically, the disclosure is related to shape-morphing elastomer composites that are adapted to have improved electrical and thermal conductivity.

The development of soft robotics and wearable technologies have led to increasing demand for functional materials that can be powered with portable electronics. One such demand is for shape morphing materials. Liquid crystal elastomers (LCEs) are a promising functional material for these applications as they exhibit thermally induced reversible deformation, contracting with heating and expanding with cooling. LCEs may exhibit thermo-reversible strains of up to 400%.

While LCEs have the potential to meet the performance characteristics for these applications, implementation is difficult because these materials lack the electrical and thermal conductivity required for shape memory activation. To address these limitations, LCEs are typically embedded with rigid fillers that enhance conductivity. However, these filler particles degrade the mechanical properties and shape morphing capabilities of the LCEs. For example, some prior art has showed that the electrical resistance was too high for Joule heated actuation of an LCE composite using bulk carbon black filler until 15 wt. % carbon black was added. At 15 wt. % carbon black, the actuation strain reduced from 35.0% in the unfilled LCE to 5.2% in the LCE with filler. With a limit to the amount of filler that can be used, surface heating has also been utilized to induce shape changes in these materials. Surface heating elements are limited in applicability beyond thicknesses of a few hundred microns due to the low intrinsic thermal conductivity of LCEs. Ambient heating limits the speed, efficiency, and utility of LCEs in practical applications. Therefore, it would be advantageous to create a LCE composite with improved thermal and/or electrical conductivity.

BRIEF SUMMARY

According to embodiments of the present disclosure is a composite comprising a liquid crystal elastomer (LCE) having shape morphing functionality and a plurality of deformable liquid metal inclusions to provide thermal and/or electrical conductivity to the composite. The liquid metal inclusions can replace rigid fillers, eliminating the drawbacks associated with such fillers. Because the liquid metal inclusions are liquid at room temperature, they freely deform with the surrounding matrix when the composite is stretched. Moreover, the liquid metal inclusions do not interfere with the ability of the LCE to change shape and perform mechanical work in response to external stimuli. The composite achieves macroscopic shape change through a liquid crystal phase transition. With these features, the soft multifunctional composite is capable of sensing, mechanically robust electronic connectivity, and active shape morphing.

In a method of fabrication, liquid metal microparticles can be mixed into an uncured LCE matrix by shear mixing. The resulting composite is capable of Joule heated actuation with sufficient thermal conductivity to function in digital circuitry. Shape-morphing in the absence of an external load can be programmed into the LCE-LM composite through photoinitiated crosslinking to enable it to reversibly transition between pre-programmed morphologies through electrical or thermal stimulation. The LCE composite retains the ability to actively shape-morph even for cases when up to 50 vol. % (or about 83 wt. %) of the composite is filled with the mechanically passive LM droplets.

DETAILED DESCRIPTION

Figure 1:
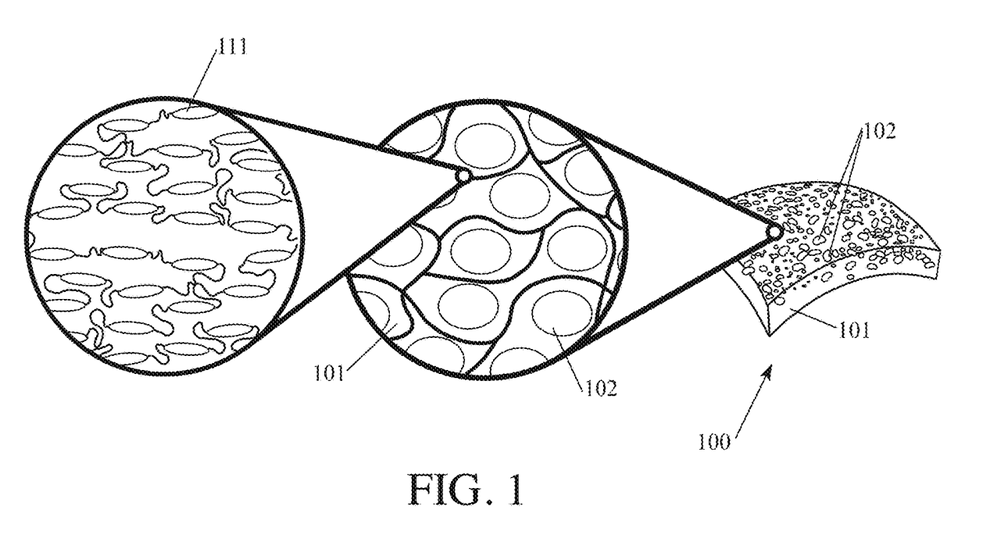
FIG. 1 are diagrams of the composite shown at varying size scales.

According to embodiments of the disclosure is a composite 100 comprising a liquid crystal elastomer (LCE) 101 and a plurality of liquid metal inclusions 102. The LCE 101 is a type of polymer having shape morphing abilities and is formed from a polymer backbone and a mesogenic group 111. A spacer 112 and crosslinker 113 may be included in the LCE 101. FIG. 1 shows the structure of the composite 100, with the molecular, microscale, and macroscale ordering of the composite 100 depicted. As shown in FIG. 1, the liquid metal droplets 102 (or microparticles) are dispersed within the LCE matrix 101 in a random, uniform pattern. That is, the composite 100 shown in FIG. 1 is homogeneous. Each liquid metal inclusion 102 has a roughly spherical shape and generally comprises an oxide skin (<10 nm) with a liquid interior. In one example embodiment, the shape of the liquid metal microparticles 102 can range from spherical to ellipsoidal with dimensions on the order of ~4-15 μm. However, the size of the droplets 102 can vary depending on the intended application and may have a range of a few to several hundred microns. Depending on the type of liquid metal used in the composite 100, the formation of the oxide skin can occur naturally during the fabrication process and aids in mixing without resorting to the use of an emulsifying agent. For example, EGaIn oxidizes in air to form a ~1-3 nm thick $Ga_2O_3$ skin.

Figure 2:
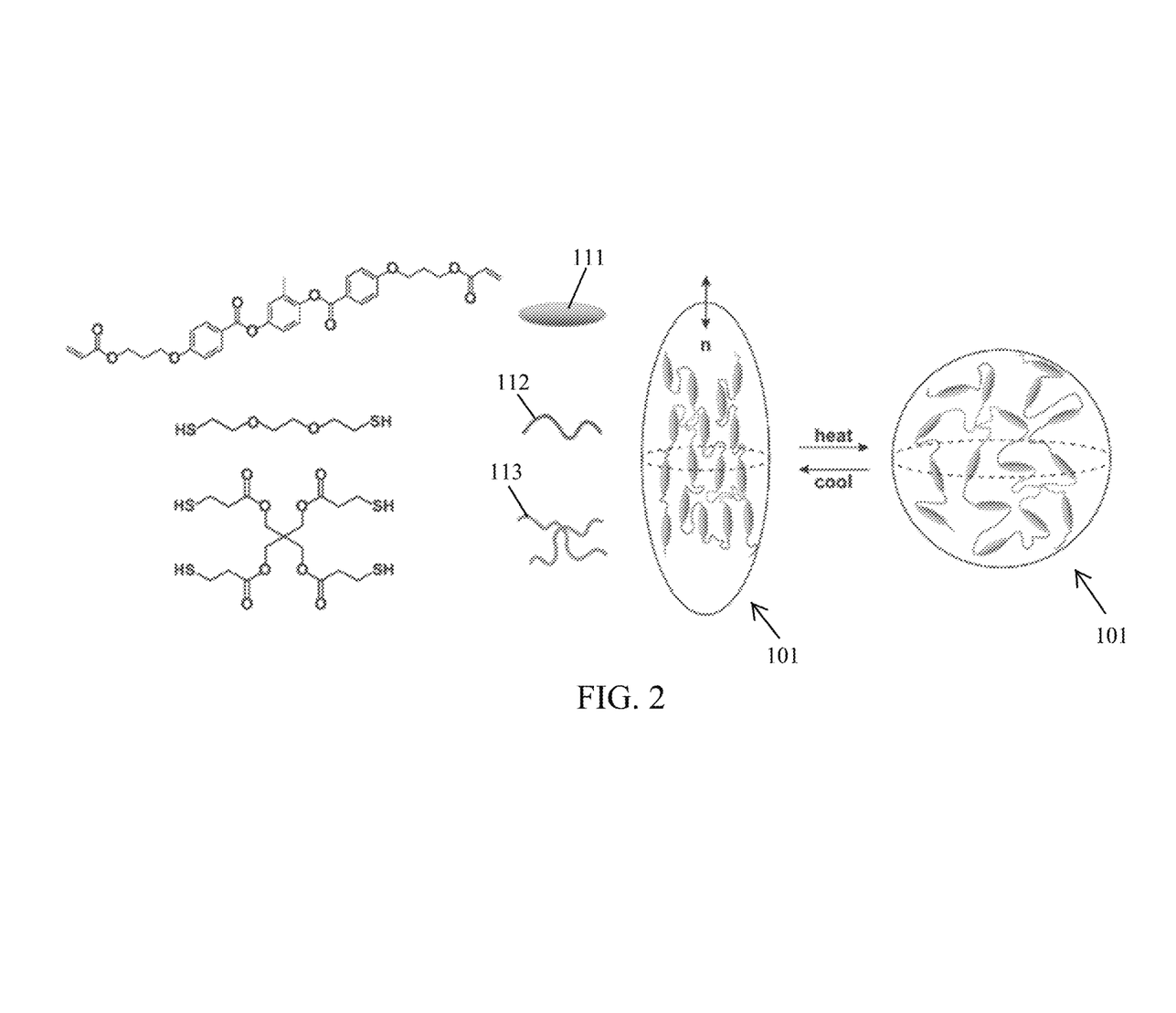
FIG. 2 is an alternative diagram of the composite.

FIG. 2 shows an alternative view of the LCE 101 and its chemical components 110/111, with the LCE 101 morphing capabilities demonstrated in cool/heat cycles. In one example embodiment, the mesogen 111 comprises 4-bis-[4-(3-acryloyloxypropypropyloxy) benzoyloxy]-2-methylbenzene (RM257, Wilshire Technologies) and the spacer 112 is 2,2-(ethylenedioxy) diethanethiol (EDDET) and the crosslinker 113 is pentaerythritol tetrakis(3-mercaptopropionate) (PETMP). A person having skill in the art will recognize that LCEs 101 can be made from a variety of components and the embodiment identified above is one such example. The mesogens 111 order anisotropically and order is disrupted above the nematic-to-isotropic transition temperature to enable macroscopic shape change.

Figure 3:
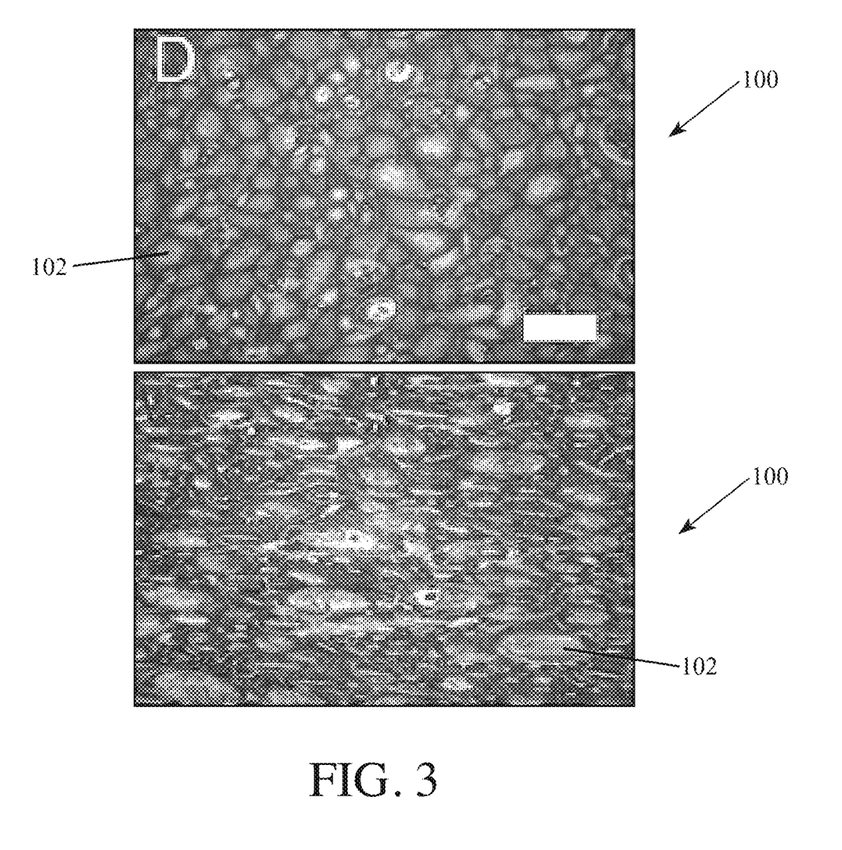
FIG. 3 is an image of the composite in both strained and unstrained states.
Figure 4A:
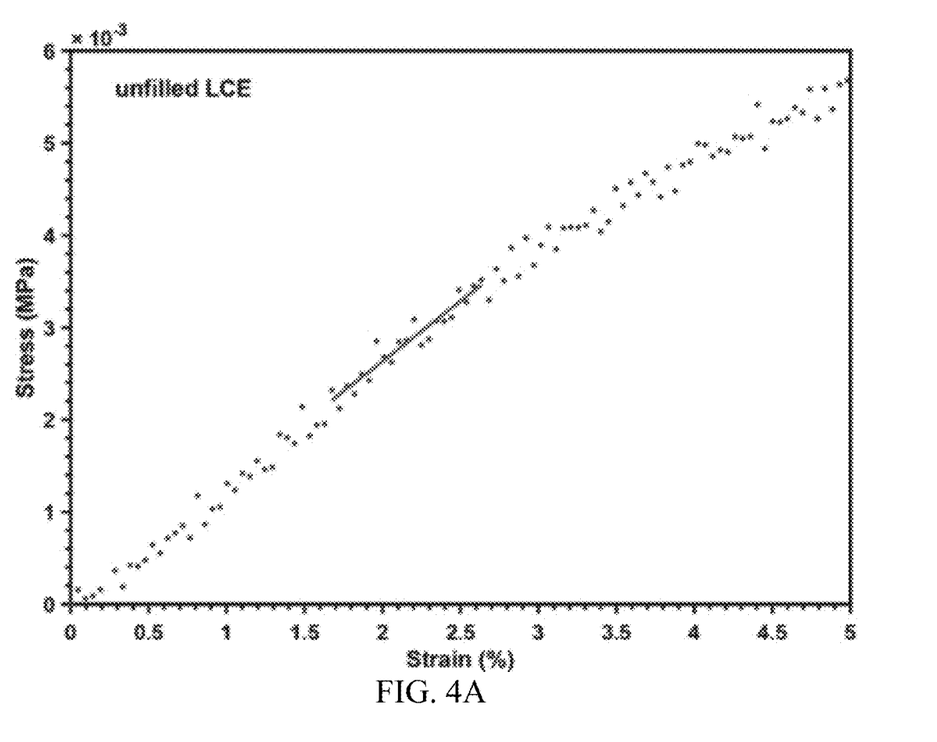
FIG. 4A-4E are graphs showing the performance of the composite at various loadings with liquid metal.
Figure 4B:
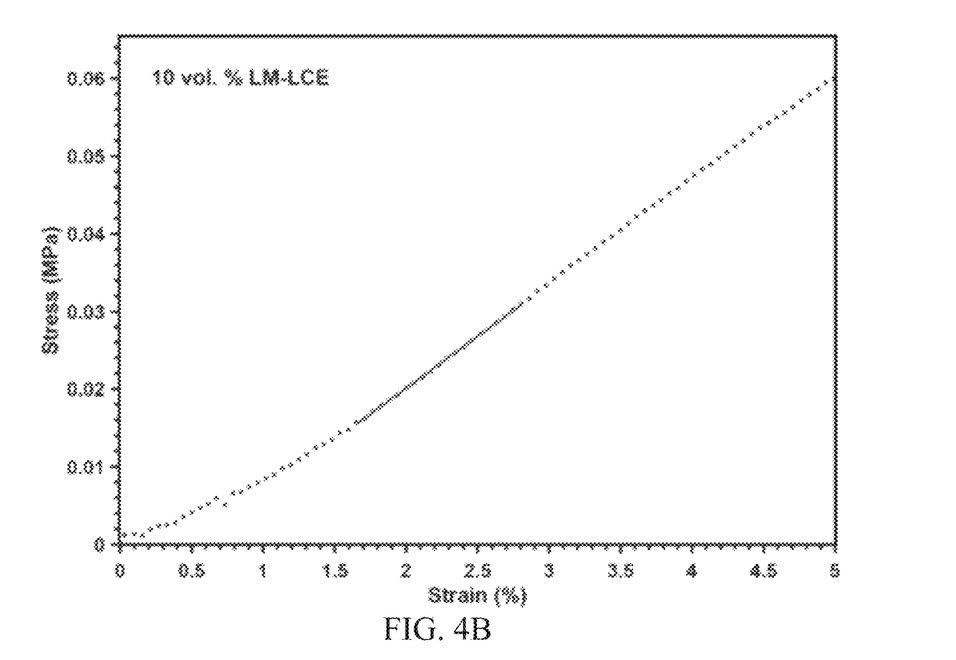
Figure 4C:
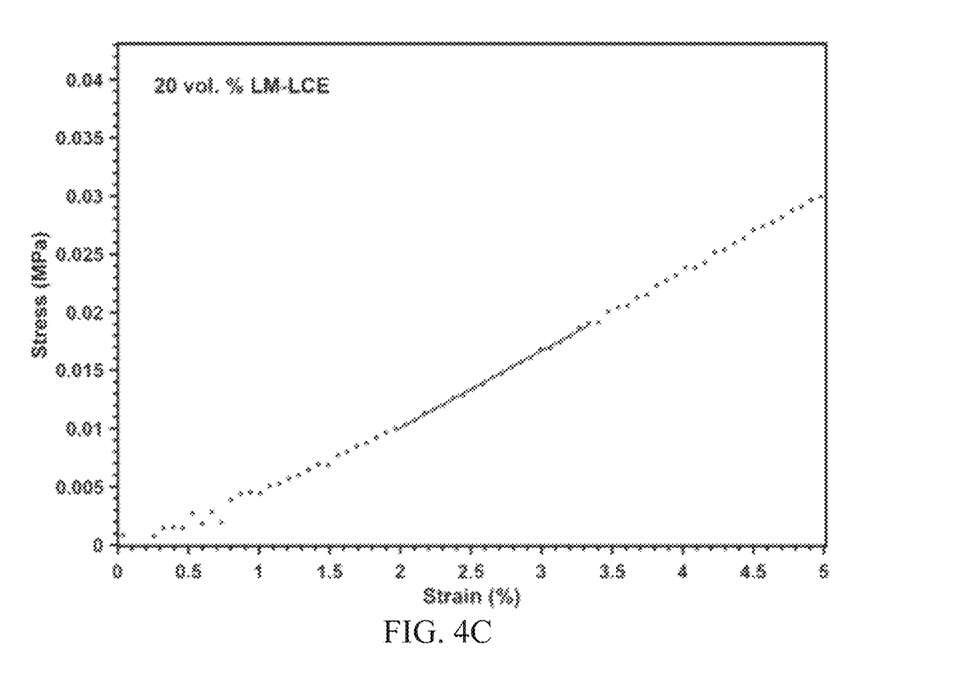
Figure 4D:
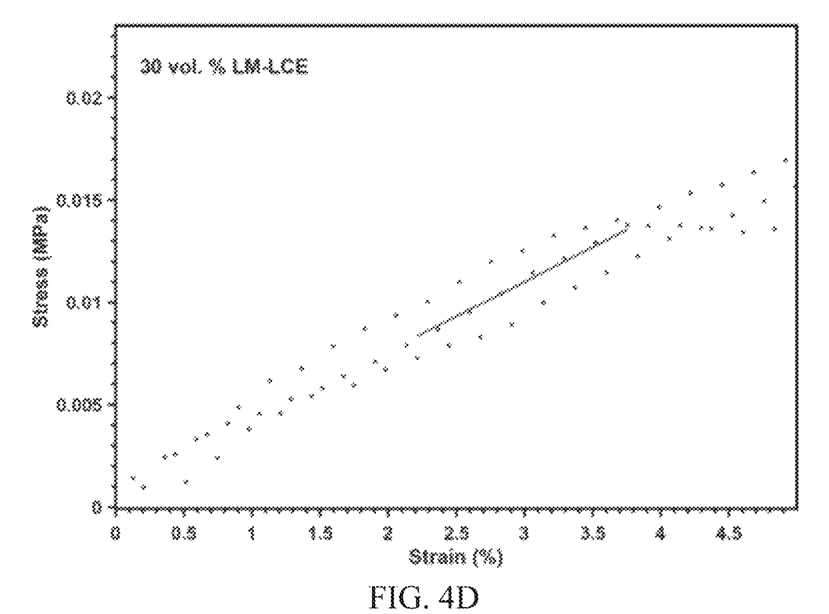
Figure 4E:
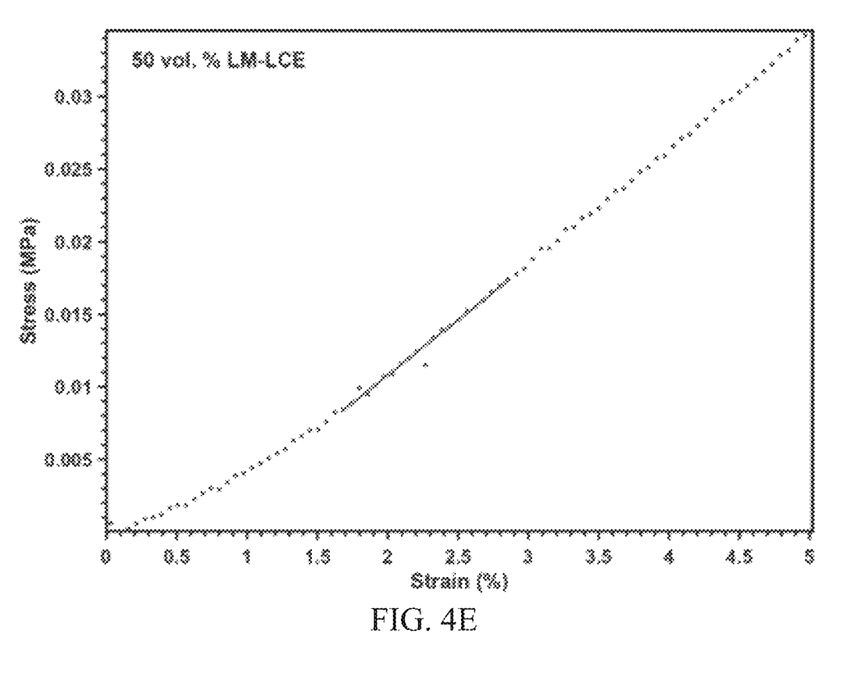
Figure 5:
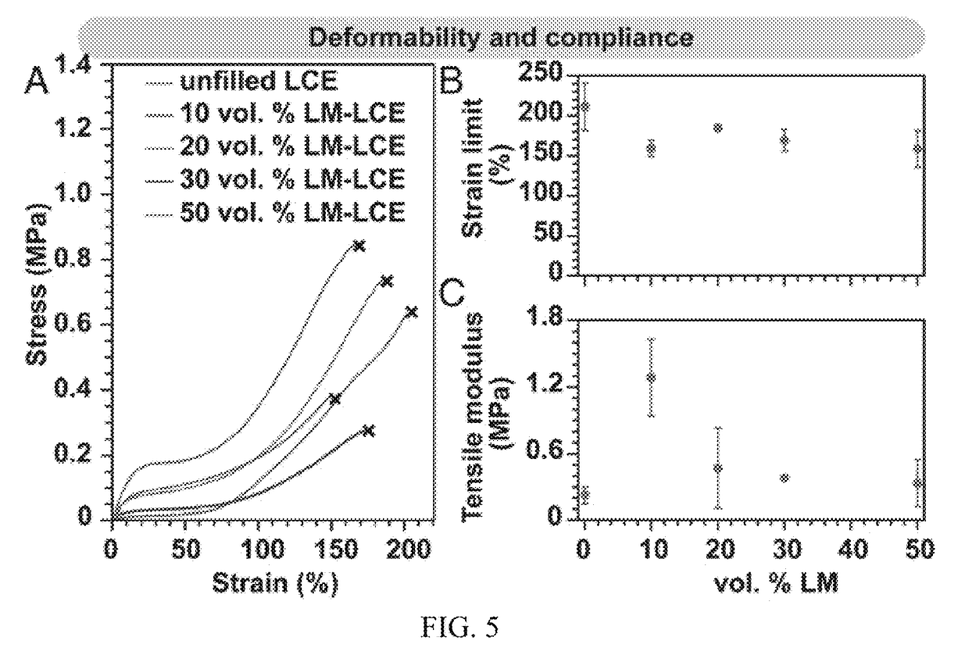
FIG. 5 is a graph showing performance characteristics of the composite.
Figure 6:
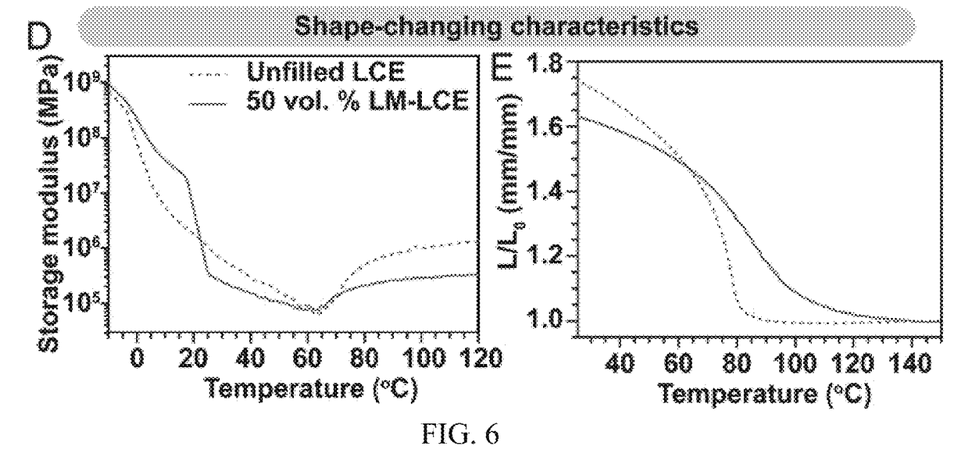
FIG. 6 is a graph showing shape-changing characteristics of the composite.

The liquid metal inclusions 102 are freely deformable, as shown in FIG. 3. The images depicted in FIG. 3 show the composite 100 in an unstrained state with spherical/ellipsoidal liquid metal inclusions 102 and in a strained state, where the liquid metal inclusions 102 have elongated along the direction of the strain. Due to the deformable nature of the liquid metal inclusions 102, the stress-strain characteristics of the composite 100 are comparable to unfilled LCEs. In FIGS. 4A-4C, the composite 100 demonstrates: (i) a linear response for small strains; (ii) semi-soft elasticity due to reorientation of the liquid crystal director as strain increases; and (iii) an elastic regime before breaking. Composites 100 across a range of liquid metal loading are deformable, with average maximum extensions >150%, as shown in FIG. 5. In several embodiments, the average tensile moduli of the composite ranges between 0.2 and 1.2 MPa for all loadings (i.e. percentage of liquid metal 102 in the composite 100), characteristic of the compliance of the LCE and composite 100 (see FIG. 5). Both the unfilled LCE and 50 vol. % composite 100 had similar storage moduli across the temperature range measured by dynamic mechanical analysis (FIG. 6). Generally, the mechanical properties of the LCE matrix 101 are not drastically influenced by the presence of liquid metal inclusions 102.

To maximize composite functionality, the liquid metal microparticles 102 should not inhibit the shape changing characteristics of the LCE 101. As determined through dynamic mechanical analysis, the nematic-to-isotropic transition temperature of the composite 100 is not influenced by liquid metal inclusions 102, occurring at 65.5±3.2° C. for the unfilled LCE and 64.7±2.7° C. for the 50 vol. % composite 100 (FIG. 6) and corresponding with a local minimum in the storage modulus. In this example, the transition temperature is within 1-2% of the unfilled LCE. A 50 vol. % composite 100 could reversibly extend to and retract from 1.62±0.10 times its original length, retaining >90% of actuation capabilities relative to an unfilled LCE at the same stress (1.74±0.01 times its original length). As the applied stress increases, the reversible change in length increases, a property typical for LCE shape-change. That the liquid metal microparticles 102 are functionally passive with respect to mechanical properties and actuation highlights a unique aspect of the composite 100—the LCE matrix 101 can deform with the deformable liquid metal inclusions 102 and retain intrinsic shape-changing capabilities.

Figure 7:
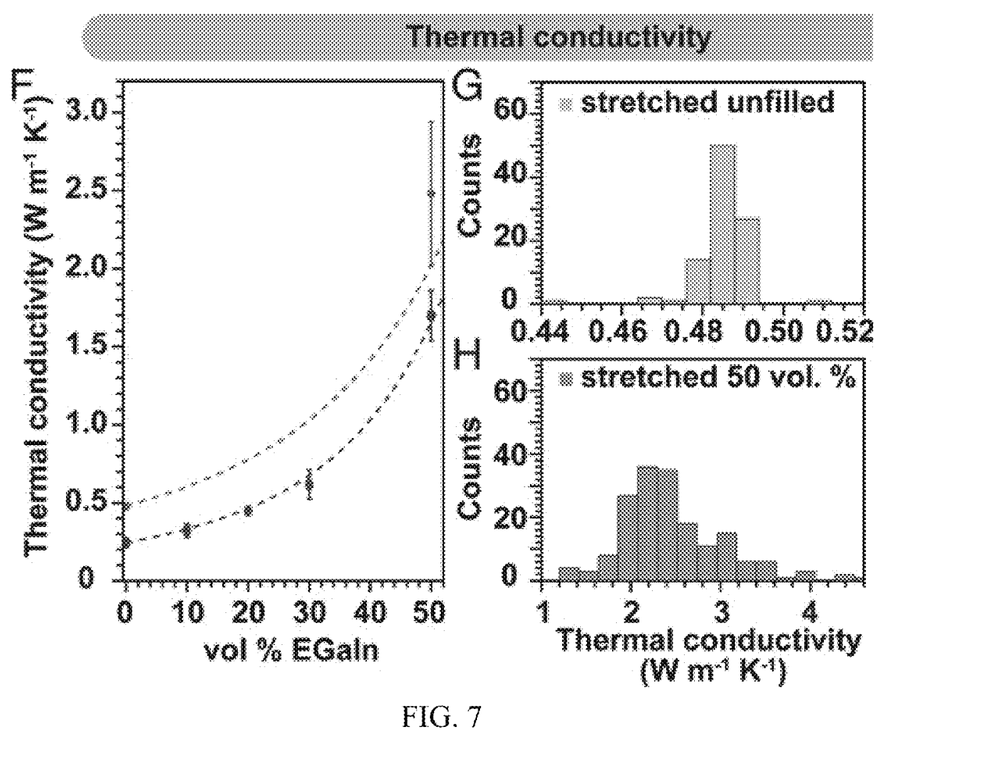
FIG. 7 is a graph showing thermal conductivity of the composite.

The inclusion of liquid microparticles 102 alters the thermal and electrical transport properties of the composite 100, as compared to an un-filled LCE. The thermal conductivity of the composite 100 increases relative to the thermal conductivity of the unfilled LCE as liquid metal microparticles 102 loading increases. The thermal conductivities of liquid metal 102 loadings of 0, 10, 20, 30, and 50 vol. % are 0.24±0.02, 0.32±0.04, 0.45±0.02, 0.62±0.09, and 1.70±0.16 W $m^{-1}$ $K^{-1}$, respectively (FIG. 7). As with other liquid metal embedded elastomers, the thermal conductivity increased along the loading direction as the liquid metal microparticles 102 elongate. The liquid metal/LCE composite 100 holds about 50-60% strain in a stress-free state due to reorientation of the liquid crystal director after being stretched. The thermal conductivity along the direction of strain increased for the unfilled LCE due to the change in liquid crystalline ordering from a polydomain to a monodomain. The average thermal conductivity of the unfilled LCE increased to 0.48±0.02 W $m^{-1}$ $K^{-1}$ (FIG. 7) along the direction of strain and was as high as 2.48±0.46 W $m^{-1}$ $K^{-1}$ for a 50 vol. % composite 100. (FIG. 7). For comparison, the average thermal conductivities perpendicular to the direction of strain were 0.25±0.003 W $m^{-1}$ $K^{-1}$ for the LCE and 1.86±0.10 W $m^{-1}$ $K^{-1}$ for the 50 vol. % composite 100. Improvements in thermal conductivity and heat dissipation are important for Joule heated actuation but also wearable electronics and soft machines that interface conductors and insulators with electronic devices, which may overheat with use.

Figure 8:
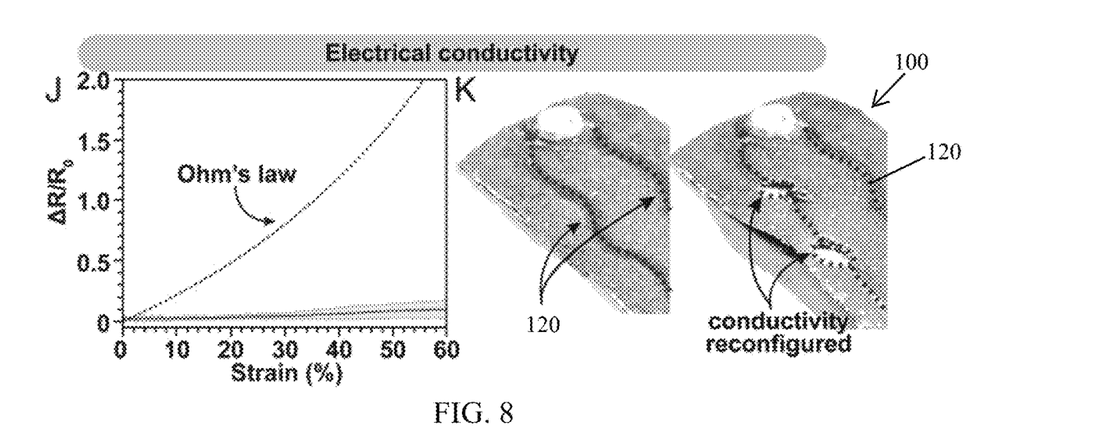
FIG. 8 is a graph showing electrical conductivity of the composite.

After fabrication, the composites 100 are inherently electrically insulating. Electrical conductivity can be induced through a process of mechanically controlled liquid metal sintering, which comprises a process applying a pressure to the composite 100 to rupture the liquid metal droplets 102, which then coalesce to form electrically conductive pathways 120. Stated differently, the process irreversibly forms percolating networks of liquid metal 102. Depending on where pressure is applied, conductivity can be limited to selective circuit traces 120 or active throughout the entire composite 100. For example, mechanical pressure can be applied only along a path between electrical components, forming a wire-like trace 120 (as shown in FIG. 8). Electrical conductivities for a 50 vol. % composite 100 where the entire sample was mechanically sintered was $1\times10^4$ to $2\times10^4$ S/m. The normalized change in resistance can be monitored as a function of strain to evaluate electromechanical coupling for the 50 vol. % composite 100 (FIG. 8). There is negligible electromechanical coupling up to 60% strain when compared to the change in normalized resistance expected according to Ohm's Law. Conductive traces 120 can be self-healing through mechanisms in which mechanical damage activates the formation of new conductive traces 120. Conductivity is stable when 1 V is applied for >65,000 seconds (18 hours), which is important for applications that require long-term Joule heating.

The composite's electrical conductivity enables the creation of internally Joule heated actuators, transducers for touch sensing, and circuit wiring for surface-mounted electronic components. Joule heated linear actuation of the composite can be excited at rates faster than 2 Hz and cycled to 50% reversible strain 15,000 times at 0.007 Hz (and 2.5% reversible strain >100,000 times at 1 Hz while still retaining >90% of its original shape-change).

In one example fabrication method, the composite 100 can be made by melting Gallium (Ga) in a 100° C. oven and, after allowing the Ga to cool without resolidifying, shear mixing to form Ga microparticles 102. The Ga microparticles 102 are then mixed with a LCE 101 and cured. Using this process, solid composites 100 can also be fabricated by solidifying the Ga microparticles 102 after curing the LCE

101. While Ga is described as the liquid metal 102, other low-melting point metals can be used, including eutectic gallium indium (EGaIn), gallium-indium-tin (Galinstan), Indalloy, NewMerc, mercury, and other metals that are liquid at or near ambient temperature.

In another example fabrication method, the composite 100 can be synthesized by mixing 75 wt. % Gallium (Ga) with 25 wt. % Indium (In) at 100° C. until the In is completely dissolved, forming an eutectic alloy which will form the liquid metal inclusions 102. The alloy is added to an uncured LCE mixture 101 before adding a catalyst by shear mixing with a stirrer 500 RPM for 30 seconds. After adding catalyst, the composite 100 is cured for >5 hours before placing the composite 100 in a 85° C. vacuum oven for >8 hours. The resulting composite 100 has liquid metal inclusions 102 in the form of droplets of ca. 200-500 μm in size.

In an alternative fabrication method, and by way of further detail, the composite 100 is created according to the following steps. 12 g of 4-bis-[4-(3-acryloyloxypropypropyloxy) benzoyloxy]-2-methylbenzene is dissolved in 4.5 g of toluene by heating in an 85° C. oven. The saturated solution is allowed to cool to room temperature before adding 0.675 g of tetra-functional thiol crosslinking monomer, pentaerythritol tetrakis(3-mercaptopropionate) (PETMP) and 3.17 g of di-functional thiol spacer monomer, 2,2-(ethylenedioxy) di-ethanethiol (EDDET). For composites synthesized with a photoinitiator, 0.576 g of PETMP. and 2.88 g of EDDET are added along with 0.144 g of the photoinitiator 2-hydroxy-4-(2-hydroxyethoxy)-2-methylpropiophenone (HHMP). After vigorous mixing, the mixture is returned to the 85° C. oven for 10 minutes. 1.5 g of the catalyst dipropylamine (DPA diluted 1:50 by weight in toluene is added after allowing the uncured mixture to cool to room temperature. If air bubbles are present, the mixture can be placed under vacuum for 60 seconds. A catalyst is stirred into the mixture slowly, and. the viscous mixture is poured into high density polyethylene molds. The reaction proceeds for >5 hours until the composite forms a stiff gel before placing the molds in an 85° C. vacuum oven for >8 hours to completely remove the solvent. After fabrication, the composite 100 is an electrical insulator. However, as previously mentioned, the composite 100 can be mechanically sintered to create electrical conductivity for internal Joule heating by applying pressure to the surface of the composite 100. After sintering, any liquid metal residue on the surface of the composite 100 can be cleaned with isopropyl alcohol.

Figure 9:
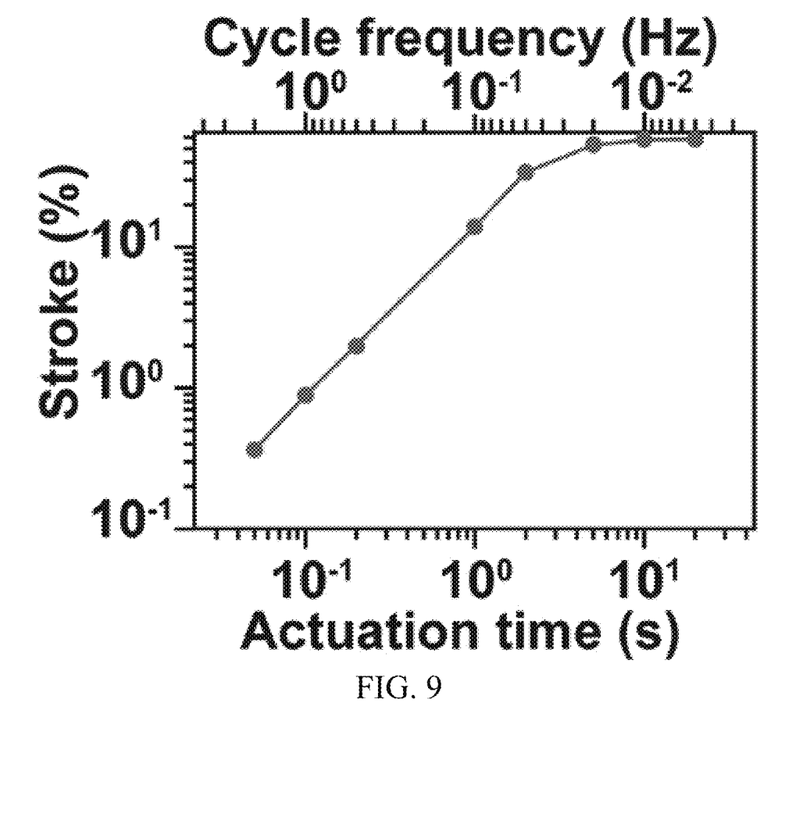
FIG. 9 is a graph showing stroke actuation.

The composites 100 that are electrically conductive can function as electrically responsive actuators that activate through Joule heating. Macroscopic deformation can be observed as a weight is lifted, and multiple actuation cycles of 8 s on and 35 s off were tracked, showing repeatability in both the actuator displacement and power consumption. FIG. 9 shows measurements of how quickly the composite 100 can actuate by tracking the normalized stroke as a function of cycle frequency. The actuation time, i.e. the active time period of the duty cycle, was set to $\frac{1}{8}^{th}$ that of the cooling time. Cycling frequencies as high as 10 Hz with actuation times as low as 10 ms are perceptible. The normalized stroke increased up to 0.02 Hz, where it remained nominally constant at 0.5 (i.e. 50% output strain at about 10-15 kPa). Actuation times on the order of hundreds of milliseconds for actively heated LCEs have been previously reported, and actuation strains at a given frequency for the soft composite 100 are consistent with previously reported LCEs that use rigid fillers.

Cycling frequency in Joule heated composites is limited by heat dissipation to the ambient environment. Thermal diffusion in the composite has a time scale approximated by the sum of internal conduction and external convection time constants. For composites 100 in a medium with a high convective heat transfer coefficient (i.e. water), a 50 vol. % composite 100 has a thermal diffusion increased by a factor of 5.

The maximum specific work density of the composite 100 was 30.5 J/kg, comparable to the maximum work density of mammalian skeletal muscle, and corresponding to a normalized dead load that was 193 times the mass of the composite. For comparison purposes, the intrinsic work density of the LCE matrix when normalized with respect to the mass of only the stimuli-responsive matrix material (i.e. 17% of the composite mass) is estimated to be as high as 179 J/kg. This calculation assumes that the mechanically inactive liquid metal particles 102 do not contribute significantly to actuation. Such an assumption is consistent with mechanical analyses that show that the liquid metal microparticles 102 do not influence mechanical properties of the composite 100.

Since Joule heating is uniform throughout the composite 100, shape-change is resilient to damage. The composite 100 can continue to lift a load by internal Joule heating after sustaining significant damage. Furthermore, the composite 100 operates normally in cold environments and when struck with a hammer. The composite 100 can also sense and respond to damage since mechanical forces activate conducting pathways 120. For example, conductive traces 120 to power an LED were induced in a 50 vol. % composite 100. Mechanical damage causes an electrical short around the LED, and the electrical current is rerouted through the composite 100. The rerouted current initiates Joule heated actuation of the LCE 101 and causes the composite 100 to contract. The mechanical damage must be substantial enough to rupture the liquid metal microparticles 102, coalesce, and reroute percolation pathways 120. The composite 100 can be stretched, deformed, and prodded without inadvertently activating new traces 120. This autonomous damage response demonstrates the versatility in material functionalities that this composite 100, with the composite capable of functioning as a transducer, conductor, and actuator.

Figure 10:
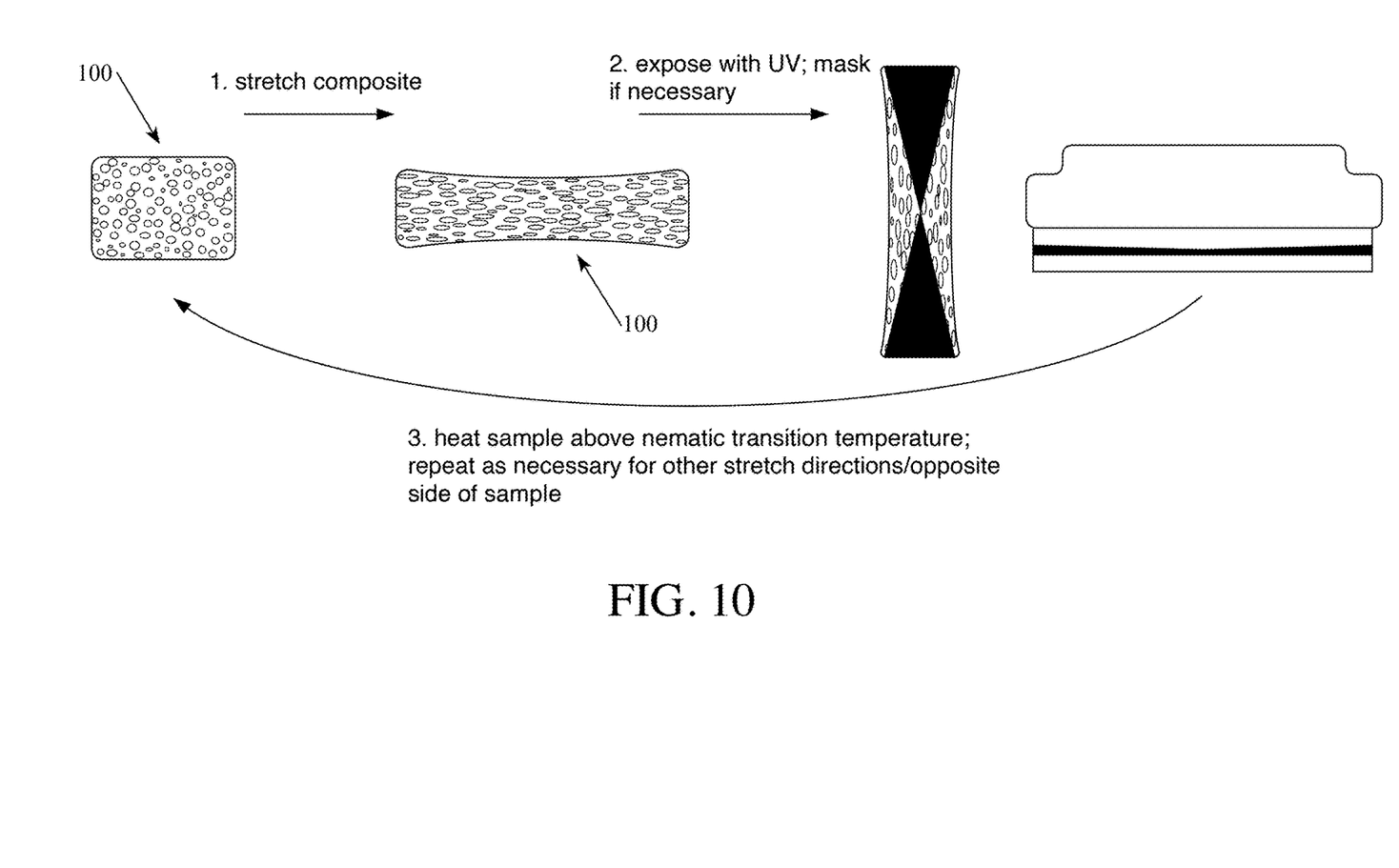
FIG. 10 is a schematic of pre-programming of the composite.

Thus far, the composite 100 discussed was cured without a preferential orientation of the nematic director; that is, the microstructure is polydomain, with liquid crystal moieties that are locally oriented but macroscopically isotropic. However, the composite 100 can also be irreversibly programmed using a photoinitiated post-curing process to lock in the molecular orientation of the LCE 101 after mechanical deformation. The appeal of photoinitiated programmability includes actuation in the absence of a bias-stress and controlled spatially-patterned shape-change that could see use in deployable and morphing structures. At zero-applied stress, a linearly programmed 50 vol. % composite 100 reversibly elongates to 1.53±0.09 times its contracted length, compared to 1.61±0.06 for a linearly programmed unfilled LCE 101. Blocking stress at failure for a linearly programmed 50 vol. % composite 100 is 119±36 kPa, on the same order of magnitude as state-of-the-art multifunctional dielectric actuators (300 kPa) and natural muscle (100-350 kPa). Complex shape changes are possible with simple modifications to the strain field during programming, and the use of an opaque stencil mask during UV exposure. FIG. 10 is a schematic for UV programming of the composite 100. In this process, the composite 100 is stretched, exposed to UV light (mask is optional), and then heated above the nematic transition temperature. The process can be repeated as necessary for other stretch directions on the opposite side of the composite 100.

Figure 11:
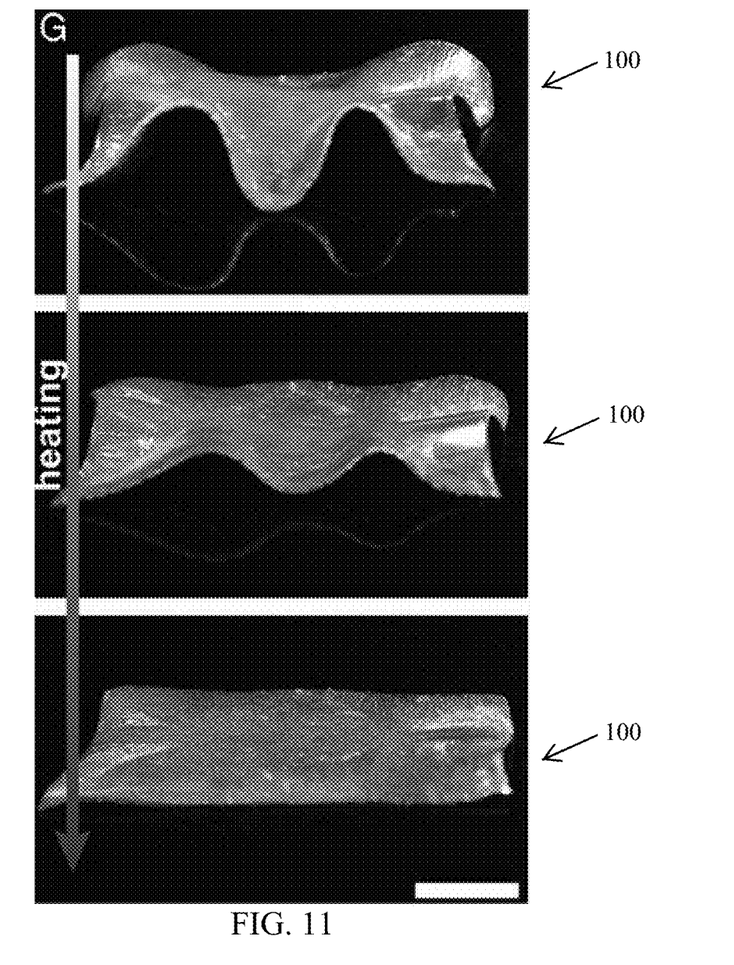
FIG. 11 are examples of complex shapes of the composite.

FIG. 11 illustrates another example of complex zero-stress shape change. The composite 100 undergoes shape-change from multiple half-cones to a flat geometry. Because the composites 100 are electrically conductive, such shape change can be induced by internal Joule heating. Joule heating can also be activated asymmetrically, enabling bistable and feasibly, multi-stable programmable structures. An example structure contracts on the side that is activated, and the monolithic composite 100 slides as each side contracts. The programmability of the LCE matrix 101 is not detrimentally disrupted by the presence of liquid metal 102 and thus is a beneficial additional functionality of the composite.

The impact of the liquid metal inclusions 102 on the composite 100 can be demonstrated by comparing a composite 100 with liquid inclusions 102 to one with solid Gallium inclusions. When solid Gallium microparticles are used, the composite 100 (composite (s) or (l) for solid or liquid gallium microparticles) was rigid with a tensile modulus >10× larger than the unfilled LCE and either liquid metal or liquid Ga-filled 50 vol. % LCE composite 100. The composite (s) began to visually tear at less than 10% strain. Gallium microparticles 102 can be melted at a temperature less than the LCE nematic-to-isotropic transition. Upon melting the gallium microparticles 102, the composite (l) 100 could extend to >50% strain. With further heating to above the transition temperature, the composite (l) 100 reversibly contracts since the inclusions 102 were in the deformable, liquid state. One aspect of utilizing Gallium vs. liquid metal is the ability to achieve zero-stress actuation without photoinitiated crosslinking. First, the composite (l) 100 is uniaxially extended and then cooled to solidify the Ga inclusions. By selectively Joule heating certain regions of the composite 100, rigid and deformable domains can coexist in a monolithic composite. The deformable regions of the composite 100 can be selectively heated above the transition temperature by Joule heating. Since the rigid regions are constrained while the deformable regions attempt to contract, curvature and buckling is observed. Solid and liquid composites 100 reveal the mechanism by which high filler loading LCEs remain mechanically functional while also introducing an additional route to unique and arbitrary shape-morphing of the composites.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

What is claimed is:

1. A composite having improved thermal conductivity comprising:
    a polymer comprising a liquid crystal elastomer, and
    a plurality of droplets comprising a liquid metal intermixed and dispersed within the polymer,
        wherein each droplet of the plurality of droplets consists of a metal oxide skin and a liquid metal interior,
        wherein the composite is compliant.

2. The composite of claim 1 further comprising a photoinitiator.

3. The composite of claim 1, wherein the liquid metal is selected from the group consisting of eutectic gallium indium, gallium, gallium alloys, gallium-indium-tin, and mercury.

4. The composite of claim 1, wherein at least a portion of the plurality of droplets has a spherical shape.

5. The composite of claim 1, wherein at least a portion of the plurality of droplets has an ellipsoidal shape.

6. The composite of claim 5, wherein the lengths of the portion of the plurality of droplets having an ellipsoidal shape are aligned to a direction of a strain placed on the composite.

7. The composite of claim 1, wherein a volume loading of the liquid metal is about 10-50%.

8. The composite of claim 1, wherein each droplet of the plurality of droplets is separated from an adjacent droplet by the polymer.

9. The composite of claim 1, wherein the plurality of droplets is uniformly dispersed within the polymer.

10. The composite of claim 1, wherein each droplet of the plurality of droplets is randomly dispersed within the polymer.

11. The composite of claim 1, wherein the composite is electrically non-conductive.

12. The composite of claim 1, wherein the composite is conductive in areas subjected to mechanical pressure.

13. The composite of claim 1, wherein a nematic-to-isotropic transition temperature of the composite is within 2% of a nematic-to-isotropic transition temperature of the liquid crystal elastomer.

14. The composite of claim 1, wherein a microstructure is polydomain.

15. The composite of claim 1, wherein a portion of the composite is stretched and exposed to UV light.

16. A method of fabricating the composite of claim 1, comprising:
    dispersing the plurality of droplets in the polymer through shear mixing.

* * * * *